United States Patent
Cheng et al.

(10) Patent No.: US 9,118,456 B2
(45) Date of Patent: *Aug. 25, 2015

(54) METHOD AND SYSTEM FOR TRANSMITTING MULTI-CARRIER UPLINK DATA AT NETWORK-SIDE

(75) Inventors: Xiang Cheng, Shenzhen (CN); Lin Liu, Shenzhen (CN); Yazhu Ke, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 142 days.

This patent is subject to a terminal disclaimer.

(21) Appl. No.: 13/496,353

(22) PCT Filed: Aug. 17, 2010

(86) PCT No.: PCT/CN2010/076074
§ 371 (c)(1),
(2), (4) Date: Mar. 15, 2012

(87) PCT Pub. No.: WO2011/082585
PCT Pub. Date: Jul. 14, 2011

(65) Prior Publication Data
US 2012/0170544 A1    Jul. 5, 2012

(30) Foreign Application Priority Data
Jan. 8, 2010  (CN) .......................... 2010 1 0002229

(51) Int. Cl.
*H04L 5/00* (2006.01)
*H04W 72/04* (2009.01)

(52) U.S. Cl.
CPC ......... *H04L 5/0098* (2013.01); *H04W 72/0433* (2013.01)

(58) Field of Classification Search
CPC ....................................................... H04W 4/00
USPC ......... 370/225, 229, 230, 252, 332, 333, 335, 370/338, 329
See application file for complete search history.

(56) References Cited

U.S. PATENT DOCUMENTS

| | | | |
|---|---|---|---|
| 8,717,977 B2* | 5/2014 | Cheng et al. .................. | 370/328 |
| 2003/0123470 A1 | 7/2003 | Kim et al. | |
| 2009/0316575 A1* | 12/2009 | Gholmieh et al. ............ | 370/225 |
| 2012/0176950 A1* | 7/2012 | Zhang et al. ................. | 370/311 |
| 2014/0119318 A1* | 5/2014 | Zhu et al. ..................... | 370/329 |

FOREIGN PATENT DOCUMENTS

| | | |
|---|---|---|
| CN | 1917417 A | 2/2007 |
| CN | 101335979 A | 12/2008 |
| CN | 101345970 A | 1/2009 |
| EP | 2077675 A1 * | 7/2009 |
| WO | 2009006821 A1 | 1/2009 |
| WO | 2009006823 A1 | 1/2009 |

OTHER PUBLICATIONS

International Search Report for PCT/CN2010/076074 Dated Nov. 25, 2010.

* cited by examiner

*Primary Examiner* — Anh-Vu Ly
*Assistant Examiner* — Abdullahi Ahmed
(74) *Attorney, Agent, or Firm* — Banner & Witcoff, Ltd.

(57) ABSTRACT

The present invention discloses a method and system for transmitting multi-carrier uplink data at a network side. The method comprises: whenever setting up or adding a multi-carrier enhanced dedicated channel cell, a radio network controller notifying a NodeB dominating the multi-carrier enhanced dedicated channel cell of carrier identifier information of a carrier corresponding to the multi-carrier enhanced dedicated channel cell; and whenever receiving data transmitted by a terminal using a multi-carrier high-speed uplink packet access technique in the multi-carrier enhanced dedicated channel cell via the carrier, the NodeB carrying the carrier identifier information of the carrier bearing the data in enhanced dedicated channel uplink data frames when constructing the enhanced dedicated channel uplink data frames, and transmitting the constructed enhanced dedicated channel uplink data frames to the radio network controller. The present invention can avoid the problem of confusion of the received data from different carriers.

19 Claims, 6 Drawing Sheets

METHOD AND SYSTEM FOR TRANSMITTING MULTI-CARRIER UPLINK DATA AT NETWORK-SIDE

TECHNICAL FIELD

The present invention relates to a wireless communication system, and in particular, to a method and system for transmitting multi-carrier enhanced dedicated channel uplink data at a network side.

BACKGROUND OF THE RELATED ART

In wireless communication systems, the Interconnection of type B (IUB for short hereinafter) interface is a logic interface between a Radio Network Controller (RNC for short) and a NodeB. The Interconnection of RNC (IUR) interface, which is an interface used by the radio network controller to exchange signaling and data with other radio network controllers, is the tie of interconnection between radio network subsystems.

When a terminal sets up a connection to a radio access network and generates soft handover at the IUR interface, resources of more than one radio network controller will be used, and different radio network controllers will function as different roles at this point.

A Serving Radio Network Controller (SRNC for short) is a radio network controller which maintains a connection between the terminal and an interface of a core network. The serving radio network controller is responsible for data transmission between the core network and the terminal and forwarding and receiving of signaling to/from the interface of the core network, is responsible for control of radio resources, and is responsible for processing of data of an air interface at layer 2 and management operations of basic radio resources, such as handover decision, outer loop power control and transformation of radio access bearer parameters to air interface transmission channel parameters, etc.

A Drift Radio Network Controller (DRNC for short) is a radio network controller other than the serving radio network controller. The drift radio network controller controls a cell used by the terminal, and can perform macro diversity combination if desired. Unless the terminal uses a common transmission channel, the drift radio network controller will not process user plane data at layer 2, but only transfer air interface data transparently to the serving radio network controller via routing of the IUR interface. There may be more than one drift radio network controller for one terminal.

The object of the high-speed uplink packet access technology is to improve capacity and data throughout in an uplink direction and reduce delay in a dedicated channel. A new transmission channel, i.e., Enhanced Dedicated Channel (E-DCH for short) is introduced by the high-speed uplink packet access technology to improve implementation of a physical layer and a media access control layer so as to achieve a maximum theoretical uplink data rate of 5.6 Mb/s. The high-speed uplink packet access technology reserves the characteristics of the soft handover.

In the high-speed uplink packet access technology, a data transmission mode is that a Media Access Control-i (MAC-i for short hereinafter) protocol data unit received via the air interface is de-multiplexed into a Media Access Control-improved segment (MAC-is for short hereinafter) protocol data unit, which is put into enhanced dedicated channel uplink data frames, to be transmitted from a NodeB to a serving radio network controller via a transport bearer corresponding to media access control streams (each media access control stream having a corresponding IUB interface and/or IUR interface transport bearer) in a form of the enhanced dedicated channel uplink data frames.

If the NodeB belongs to the serving radio network controller, the enhanced dedicated channel uplink data frames are transmitted directly from the NodeB to the serving radio network controller without a relay of the drift radio network controller, as shown in FIG. 1. After receiving the enhanced dedicated channel uplink data frames, the serving radio network controller parses data carried in the enhanced dedicated channel uplink data frames depending on only control information, such as data amount, data length, etc., which is also carried in the enhanced dedicated channel uplink data frames, without additional context information and additionally recording the context information.

If the NodeB belongs to the drift radio network controller, the enhanced dedicated channel uplink data frames are transmitted from the NodeB to the drift radio network controller, and forwarded by the drift radio network controller to the serving radio network controller, as shown in FIG. 2. The drift radio network controller only provides transmission network layer resources to forward the enhanced dedicated channel uplink data frames to the serving radio network controller. Radio network layer resources of the drift radio network controller are bypassed and the enhanced dedicated channel uplink data frames and their specific contents can not be seen, that is, the drift radio network controller can only transparently forward the enhanced dedicated channel uplink data frames, and can not view the enhanced dedicated channel uplink data frames and reset their contents.

With the development of the technology, it is desirable that a dual-carrier high-speed uplink packet access technology (which enables the terminal to transmit data on two carriers with the high-speed uplink packet access technology, so as to redouble the uplink data rate) is introduced into existing systems. A carrier of the two carriers which contains a High-Speed Dedicated Physical Control Channel (HS-DPCCH for short) is referred to as a primary carrier, and the other carrier of the two carriers is referred to as a secondary carrier. For a terminal, each carrier in the two carriers has its own independent enhanced dedicated channel activation set (or is referred to as micro diversity). The introduction of the dual-carrier high-speed uplink packet access technology needs to consider the extensibility of subsequent multiple carriers (such as three carriers, four carriers). A carrier in the multiple carriers which contains the High-Speed Dedicated Physical Control Channel is referred to as a primary carrier, and other carriers are referred to as the second carrier, the third carrier, and the fourth carrier in the four carriers, respectively.

In the existing technology, a specific configuration method for the terminal using the multi-carrier high-speed uplink packet access technology is as follows.

When there are not only primary carrier enhanced dedicated channel cells but also secondary carrier enhanced dedicated channel cells among all cells which are dominated by a NodeB or drift radio network controller and provide radio resources for terminals using the multi-carrier high-speed uplink packet access technology, the serving radio network controller notifies the NodeB or drift radio network controller of carrier identifiers corresponding to any two or more carriers in the multiple carriers only when setting up or adding enhanced dedicated channel cells of any two or more carriers in the multiple carriers in advance. In a complex scene, there is NodeB 1 (there is both cell 1 which is a primary carrier enhanced dedicated channel cell and cell 2 which is a secondary carrier enhanced dedicated channel cell under NodeB 1) and drift radio network controller 2 (there is both cell 4 which is a primary carrier enhanced dedicated channel cell and cell 5 which is a secondary carrier enhanced dedicated channel cell under drift radio network controller 2) as shown in FIG. 3. In this scene, only when setting up or adding enhanced dedicated channel cells of the primary carrier and the secondary carrier in advance, the serving radio network controller notifies NodeB 1 of the carrier identifiers corresponding to the two carriers respectively, the carrier identifier corresponding to the carrier of cell 1 in the two carriers being the primary carrier (or the first carrier) and the carrier identifier corresponding to the carrier of cell 2 in the two carriers being the secondary carrier (or the second carrier); and notifies drift radio network controller 2 of the carrier identifiers corresponding to the two carriers respectively, the carrier identifier corresponding to the carrier of cell 4 in the two carriers being the primary carrier (or the first carrier) and the carrier identifier corresponding to the carrier of cell 5 in the two carriers being the secondary carrier (or the second carrier).

In the case that there is only an enhanced dedicated channel cell of a single carrier in the multiple carriers among all cells which are dominated by a NodeB or drift radio network controller and provide radio resources for terminals using the multi-carrier high-speed uplink packet access technology, the serving radio network controller sets up or adds the enhanced dedicated channel cell of the single carrier in the multiple carriers in advance in a traditional single carrier mode, and does not notify the NodeB or drift radio network controller of any information of the multiple carriers and a carrier identifier corresponding to the single carrier. The NodeB or drift radio network controller can only see and believe that the terminal uses single carrier resources, and does not know that the terminal uses the multi-carrier high-speed uplink packet access technology (only uses resources of the single carrier in the multiple carriers under the NodeB or drift radio network controller), and certainly also does not know the carrier identifier corresponding to the single carrier in the multiple carriers. In the scene as shown in FIG. 3, there are NodeB 2 (there is only enhanced dedicated channel cell 3 of a single carrier (the primary carrier) in the multiple carriers under NodeB 2) and drift radio network controller 3 (there is only enhanced dedicated channel cell 6 of a single carrier (the secondary carrier) in the multiple carriers under drift radio network controller 3). In this scene, when serving radio network controller 1 sets up or adds an enhanced dedicated channel cell of the single carrier (the primary carrier or the secondary carrier) in advance using the traditional single carrier mode, it does not notify the NodeB and/or drift radio network controller of any information of the multiple carriers and the carrier identifier corresponding to the single carrier.

In the existing technology, an "uplink multiplexing information" information element is added to an enhanced dedicated channel uplink data frame to adapt the introduction of the dual-carrier high-speed uplink packet access technology. The "uplink multiplexing information" is used to represent a carrier identifier of a carrier from which the data carried in the enhanced dedicated channel uplink data frames is received. In the existing technology, the serving radio network controller must determine whether data carried in the enhanced dedicated channel uplink data frames is from the primary carrier or from the secondary carrier so as to reorder the data and perform micro-diversity combination based on individual carriers. Once the received data from different carriers are confused, the serving radio network controller can not distinguish the data, and can not normally reorder the data and perform micro-diversity combination, and all data is erroneous, resulting in unavailability of actual services and final offline of the terminal.

Based on the configuration and usage mode in the existing technology, in the scene illustrated in FIG. 3, the following conditions will occur (see FIG. 4).

Serving radio network controller 1 receives, via the IUR interface, an enhanced dedicated channel uplink data frame numbered 1 which is forwarded by drift radio network controller 3. Data carried in the enhanced dedicated channel uplink data frame is actually from the secondary carrier; however, there is no carrier identifier describing the secondary carrier in the enhanced dedicated channel uplink data frame.

Serving radio network controller 1 receives, via the IUB interface, enhanced dedicated channel uplink data frames numbered 3 and 4 which are transmitted by NodeB 1. Data carried in the enhanced dedicated channel uplink data frame numbered 3 is actually from the primary carrier, and "uplink multiplexing information" in this frame is indicated as "the primary carrier". Data carried in the enhanced dedicated channel uplink data frame numbered 4 is actually from the secondary carrier, and "uplink multiplexing information" in this frame is indicated as "the secondary carrier".

Serving radio network controller 1 receives, via the IUB interface, an enhanced dedicated channel uplink data frame numbered 5 which is transmitted by NodeB 2. Data carried in the enhanced dedicated channel uplink data frame is actually from the primary carrier; however, there is no carrier identifier describing the secondary carrier in this enhanced dedicated channel uplink data frame.

Serving radio network controller 1 receives, via the IUR interface, enhanced dedicated channel uplink data frames numbered 6 and 7 which are forwarded by drift radio network controller 2. Data carried in the enhanced dedicated channel uplink data frames numbered 6 and 7 is actually from both the primary carrier and the secondary carrier; however, there is no carrier identifier describing the secondary carrier in these enhanced dedicated channel uplink data frames.

Thus, the problem that a serving radio network controller can not determine whether the data carried in the enhanced dedicated channel uplink data frame is from the primary carrier or the secondary carrier will occur in the existing technology. The radio network controller can not determine the source of the data, and thus can not normally reorder the data and perform micro-diversity combination, and all data is discarded erroneously, resulting in unavailability of actual services and final offline. It also means that the existing multi-carrier high-speed uplink packet access technologies are unavailable.

CONTENT OF THE INVENTION

The technical problem to be solved by the present invention is to provide a method and system for transmitting multi-carrier uplink data at a network side so as to ensure the availability of the multi-carrier high-speed uplink packet access technology and avoid offline due to erroneous discarding of data.

In order to solve the above technical problem, the present invention provides a method for transmitting multi-carrier uplink data at a network side comprising:

whenever setting up or adding a multi-carrier enhanced dedicated channel cell, a radio network controller notifying a NodeB dominating the multi-carrier enhanced dedicated channel cell of carrier identifier information of a carrier corresponding to the multi-carrier enhanced dedicated channel cell; and whenever receiving data transmitted by a terminal using a multi-carrier high-speed uplink packet access technique in the multi-carrier enhanced dedicated channel cell via the carrier, the NodeB carrying the carrier identifier information of the carrier bearing the data in enhanced dedicated channel uplink data frames when constructing the enhanced dedicated channel uplink data frames, and transmitting the constructed enhanced dedicated channel uplink data frames to the radio network controller.

The method further comprises the radio network controller parsing the carrier identifier information from the enhanced dedicated channel uplink data frames after receiving the enhanced dedicated channel uplink data frames, and reordering the received data with the same carrier identifier of the terminal.

When the NodeB belongs to the serving radio network controller, the method comprises:

the serving radio network controller notifying the NodeB of carrier identifier information of a carrier corresponding to a multi-carrier enhanced dedicated channel cell when indicating the NodeB to set up or add the multi-carrier enhanced dedicated channel cell;

in the multi-carrier enhanced dedicated channel cell, after receiving the data transmitted by the terminal using the multi-carrier high-speed uplink packet access technology from an air interface, the NodeB carrying the carrier identifier information of the carrier of the multi-carrier enhanced dedicated channel cell in the enhanced dedicated channel uplink data frames when putting the data received from the air interface into the enhanced dedicated channel uplink data frames, and transmitting the enhanced dedicated channel uplink data frames to the serving radio network controller; and the serving radio network controller receiving and parsing the enhanced dedicated channel uplink data frames to obtain the carrier identifier information, and reordering the received data with the same carrier identifier of the terminal.

When the NodeB belongs to a drift radio network controller, the method comprises:

the serving radio network controller indicating the drift radio network controller to set up or add a multi-carrier enhanced dedicated channel cell, and notifying the drift radio network controller of carrier identifier information corresponding to a carrier of the multi-carrier enhanced dedicated channel cell in multiple carriers;

the drift radio network controller indicating the NodeB dominated by the drift radio network controller to set up or add the multi-carrier enhanced dedicated channel cell according to an indication of the serving radio network controller, and notifying the NodeB of carrier identifier information of a carrier corresponding to the multi-carrier enhanced dedicated channel cell;

in the multi-carrier enhanced dedicated channel cell, after receiving the data transmitted by the terminal using the multi-carrier high-speed uplink packet access technology from an air interface, the NodeB carrying the carrier information of the carrier of the multi-carrier enhanced dedicated channel cell in the enhanced dedicated channel uplink data frames when putting the data received from the air interface into the enhanced dedicated channel uplink data frames, and transmitting the enhanced dedicated channel uplink data frames to the drift radio network controller;

the drift radio network controller forwarding the enhanced dedicated channel uplink data frames to the serving radio network controller; and the serving radio network controller receiving and parsing the enhanced dedicated channel uplink data frames to obtain the carrier identifier information, and reordering the received data with the same carrier identifier of the terminal.

The radio network controller sets up or adds the multi-carrier enhanced dedicated channel cell through a radio link setup process or a radio link adding process.

The carrier identifier information is used to identify carriers, and in a dual-carrier system, the carrier identifier information identifies a primary carrier and an secondary carrier; in a three-carrier system, the carrier identifier information identifies a primary carrier, a second carrier and a third carrier; and in a four-carrier system, the carrier identifier information identifies a primary carrier, a second carrier, a third carrier and a fourth carrier.

Carrying the carrier identifier information in the enhanced dedicated channel uplink data frames comprises filling uplink multiplexing information information-elements in the enhanced dedicated channel uplink data frames with the carrier identifier information of the carrier.

In order to solve the above technical problem, the present invention provides a system for transmitting multi-carrier uplink data at a network side comprising a radio network controller and a NodeB; wherein the radio network controller is configured to, whenever setting up or adding a multi-carrier enhanced dedicated channel cell, notify a NodeB dominating the multi-carrier enhanced dedicated channel cell of carrier identifier information of a carrier corresponding to the multi-carrier enhanced dedicated channel cell; and the NodeB is configured to, whenever receiving data transmitted by a terminal using a multi-carrier high-speed uplink packet access technique in the multi-carrier enhanced dedicated channel cell via the carrier, carry the carrier identifier information of the carrier bearing the data in enhanced dedicated channel uplink data frames when constructing the enhanced dedicated channel uplink data frames, and transmit the constructed enhanced dedicated channel uplink data frames to the radio network controller.

The radio network controller is further configured to parse the carrier identifier information from the enhanced dedicated channel uplink data frames after receiving the enhanced dedicated channel uplink data frames, and reorder the received data with the same carrier identifier of the terminal.

The radio network controller includes a serving radio network controller and a drift radio network controller, wherein the serving radio network controller is configured to notify the NodeB dominating a multi-carrier enhanced dedicated channel cell of carrier identifier information of a carrier corresponding to the multi-carrier enhanced dedicated channel cell when indicating the NodeB to set up or add the multi-carrier enhanced dedicated channel cell, or notify the drift radio network controller of the carrier information of the carrier corresponding to the multi-carrier enhanced dedicated channel cell when indicating the drift radio network controller to set up or add the multi-carrier enhanced dedicated channel cell; and the drift radio network controller is configured to notify the NodeB dominating the multi-carrier enhanced dedicated channel cell of carrier identifier information of a carrier corresponding to the multi-carrier enhanced dedicated channel cell according to an indication of the serving radio network controller; and forward the enhanced dedicated channel uplink data frames to the serving radio network controller after receiving the enhanced dedicated channel uplink data frames transmitted by the NodeB.

Considering all possible scenes, the present invention provides a method for transmitting and receiving multi-carrier enhanced dedicated channel uplink data frames between a NodeB, drift radio network controller and serving radio network controller at a network side such that in the process where carrier identifier information corresponding to a carrier of a multi-carrier enhanced dedicated channel cell in multiple carriers is notified when the multi-carrier enhanced dedicated channel cell is set up or added and the carrier identifier information is applied to setting, transmitting and receiving of the enhanced dedicated channel uplink data frames, the carriers from which data carried in the enhanced dedicated channel uplink data frames is received can be correctly identified and distinguished, so as to ensure the availability of the multi-carrier high-speed uplink packet access technology.

With the method in accordance with the present invention, the problem of confusing the received data from different carriers can be avoided such that the radio network controller of an aggregation party can clearly distinguish the data from various carriers to ensure normal transmission of actual service data of the terminal, avoid offline, and ensure the availability of the dual-carrier high-speed uplink packet access technology.

PREFERRED EMBODIMENTS OF THE PRESENT INVENTION

Figure 4:
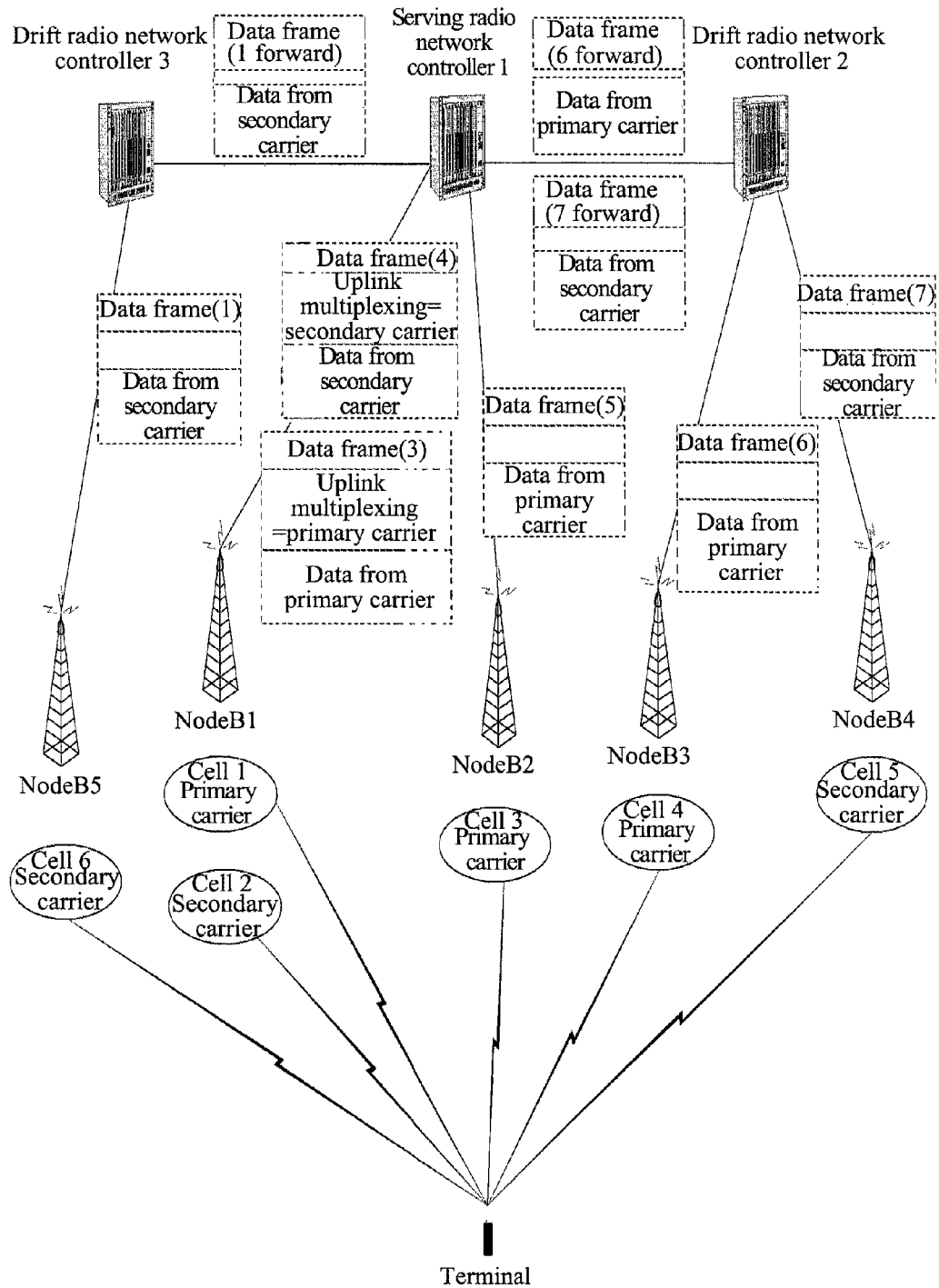
FIG. 4 is a schematic diagram of setting and transmitting enhanced dedicated channel uplink data frames on each interface in the scene illustrated in FIG. 3.

The defects of the existing technology will be analyzed first hereinafter. With respect to the scene illustrated in FIG. 4, in which serving radio network controller 1 determines whether data carried in enhanced dedicated channel uplink data frames is from a primary carrier or an secondary carrier after receiving the enhanced dedicated channel uplink data frame on each interface. Errors which will occur in this scene and their reasons will be described below.

Serving radio network controller 1 receives, via the IUR interface, the enhanced dedicated channel uplink data frames numbered 6 and 7 relayed by drift radio network controller 2. When setting up or adding enhanced dedicated channel cells of the primary carrier and the secondary carrier in drift radio network controller 2 in advance, the serving radio network controller 1 notifies drift radio network controller 2 of carrier identifiers corresponding to the two carriers, that is, a carrier identifier corresponding to the carrier of cell 4 in the two carriers is the primary carrier (or the first carrier); and a carrier identifier corresponding to the carrier of cell 5 in the two carriers is the secondary carrier (or the second carrier). However, as the drift radio network controller can only transparently forward the enhanced dedicated channel uplink data frames and can not view the enhanced dedicated channel uplink data frame and reset their contents, the drift radio network controller can not reset the contents, even if it can or hopes to add the carrier identifiers in the enhanced dedicated channel uplink data frames. It is conceivable that serving radio network controller 1 configures the carrier identifiers corresponding to the two carriers in advance and hopes to determine whether data in the enhanced dedicated channel uplink data frames is from the primary carrier or the secondary carrier based on "uplink multiplexing information" in the enhanced dedicated channel uplink data frames. However, because the "uplink multiplexing information" in the actually received enhanced dedicated channel uplink data frames numbered 6 and 7 does not indicate the carrier identifiers or there is no "uplink multiplexing information" at all, serving radio network controller 1 can not identify the source of the carriers, and can only discard the data.

An enhanced dedicated channel uplink data frame numbered 1 relayed by drift radio network controller 3 is received via the IUR interface. Further, an enhanced dedicated channel uplink data frame numbered 5 which is transmitted by NodeB 2 is received via the IUB interface. However, the actually received enhanced dedicated channel uplink data frames numbered 1 and 5 do not indicate the "uplink multiplexing information" of the carrier identifiers, because the serving radio network controller does not record and store a carrier identifier of a single carrier when setting up or adding an enhanced dedicated channel cell of the single carrier in the multiple carriers. In addition, after receiving the enhanced dedicated channel uplink data frames, the serving radio network controller parses the data carried in the enhanced dedicated channel uplink data frames only depending on control information, such as data amount, data length, etc., which is also carried in the enhanced dedicated channel uplink data frames, without additional context information and additionally recording the context information. Therefore, serving radio network controller 1 can not identify whether the enhanced dedicated channel uplink data frames are from the primary carrier or the secondary carrier, and can only discard the data.

The inventive concept of the present invention is that whenever setting up or adding a multi-carrier enhanced dedicated channel cell, a radio network controller notifies a NodeB dominating the cell of carrier identifier information of a carrier corresponding to the cell; and whenever receiving data transmitted by a terminal using a multi-carrier high-speed uplink packet access technique in the cell via the carrier, the NodeB carries the carrier identifier information of the carrier bearing the data in enhanced dedicated channel uplink data frames when constructing the enhanced dedicated channel uplink data frames, and transmits the constructed enhanced dedicated channel uplink data frames to the radio network controller.

The radio network controller parses the carrier identifier information from the enhanced dedicated channel uplink data frames after receiving them, and reorders the received data with the same carrier identifier of the terminal.

Specifically, when the NodeB belongs to a serving radio network controller, the technical scheme includes the following steps 1 to 4, where a radio network controller refers to a serving radio network controller.

In step 1, for a terminal using a multi-carrier high-speed uplink packet access technology, when indicating a NodeB to set up or add a multi-carrier enhanced dedicated channel cell, a radio network controller notifies the NodeB of carrier identifier information of a carrier corresponding to the multi-carrier enhanced dedicated channel cell.

Whenever setting up the first multi-carrier enhanced dedicated channel cell, the radio network controller will notify the NodeB of carrier identifier information of a carrier corresponding to the first multi-carrier enhanced dedicated channel cell, and when adding the second multi-carrier enhanced dedicated channel cell to the same carrier, the radio network controller may or may not notify the NodeB of the carrier identifier information of the carrier in a message, because the NodeB has been notified of the carrier identifier when the first multi-carrier enhanced dedicated channel cell is set up.

The "enhanced dedicated channel cell" refers to a cell using the enhanced dedicated channel in an uplink direction; the "multi-carrier enhanced dedicated channel cell" refers to a cell using the enhanced dedicated channel in an uplink direction of a carrier in multiple carriers, that is, the carrier corresponding to the enhanced dedicated channel cell is any carrier in the multiple carriers.

The radio network controller generally sets up or adds the multi-carrier enhanced dedicated channel cell through a radio link setup process or a radio link adding process.

The carrier identifier of the carrier corresponding to the multi-carrier enhanced dedicated channel cell refers to carrier identifier information corresponding to the carrier in the multiple carriers. The carrier identifier information is used to identify the carrier. In a dual-carrier system, the carrier identifier information identifies a primary carrier, a secondary carrier, or a first carrier, a second carrier. In a three-carrier system, the carrier identifier information identifies a primary carrier (or a first carrier), a second carrier, and a third carrier. In a four-carrier system, the carrier identifier information identifies a primary carrier (or a first carrier), a second carrier, a third carrier, and a fourth carrier.

In step 2, the NodeB sets the enhanced dedicated channel uplink data frames using the carrier identifier information of the carrier of the multi-carrier enhanced dedicated channel cell. Specifically, in the multi-carrier enhanced dedicated channel cell, after receiving data from the air interface, the NodeB sets "uplink multiplexing information" in the enhanced dedicated channel uplink data frames as the carrier identifier information of the carrier of the multi-carrier enhanced dedicated channel cell when putting the data into the enhanced dedicated channel uplink data frames, that is, fills an uplink multiplexing information information-element in the enhanced dedicated channel uplink data frame with the carrier identifier information of the carrier.

The data received from the air interface refers to a MAC-i protocol data unit received from the air interface. Putting the data received from the air interface into the enhanced dedicated channel uplink data frame comprises firstly de-multiplexing the MAC-i protocol data unit received from the air interface into a MAC-is protocol data unit, and then putting the MAC-is protocol data unit into the enhanced dedicated channel uplink data frames.

In step 3, the NodeB transmits the enhanced dedicated channel uplink data frames to the radio network controller, wherein "uplink multiplexing information" in the enhanced dedicated channel uplink data frames refers to the carrier identifier information of the carrier bearing the data in the enhanced dedicated channel uplink data frame;

In step 4, the radio network controller receives the enhanced dedicated channel uplink data frames, and parses the "uplink multiplexing information" in the enhanced dedicated channel uplink data frame to obtain the carrier identifier information of the carrier bearing the data in the enhanced dedicated channel uplink data frame.

The radio network controller reorders the received data in the enhanced dedicated channel uplink data frames with the same carrier identifier of the terminal.

The difference between the technical scheme where the NodeB belongs to a drift radio network controller and the technical scheme where the NodeB belongs to a serving radio network controller is as follows.

In step 1, the serving radio network controller indicates the drift radio network controller to set up or add a multi-carrier enhanced dedicated channel cell, and notifies the drift radio network controller of carrier identifier information corresponding to a carrier of the multi-carrier enhanced dedicated channel cell in the multiple carriers; and then the drift radio network controller indicates the NodeB to set up or add a multi-carrier enhanced dedicated channel cell according to an indication of the serving radio network controller, and notifies the NodeB of an carrier identifier corresponding to a carrier of the multi-carrier enhanced dedicated channel cell in the multiple carriers.

In step 3, the NodeB firstly transmits the enhanced dedicated channel uplink data frames to the drift radio network controller, which forwards the enhanced dedicated channel uplink data frames to the serving radio network controller.

In step 4, the serving radio network controller receives, parses and reorders the dedicated channel uplink data frames.

Figure 1:
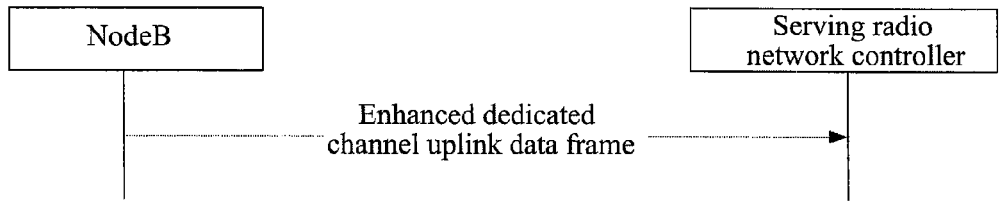
FIG. 1 is a schematic diagram of a process of transmitting and receiving enhanced dedicated channel uplink data frames when a NodeB belongs to a serving radio network controller.
Figure 2:
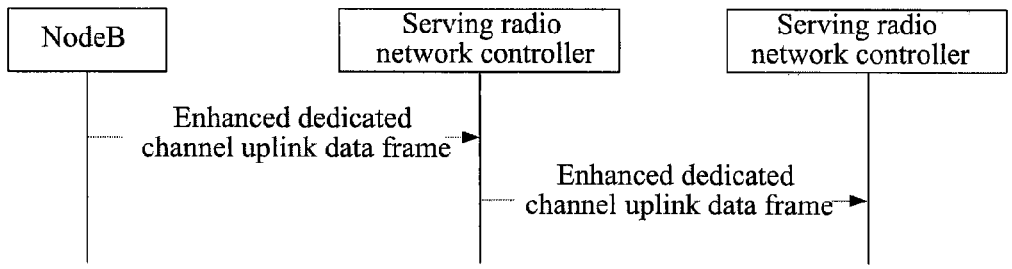
FIG. 2 is a schematic diagram of a process of transmitting and receiving enhanced dedicated channel uplink data frames when a NodeB belongs to a drift radio network controller.
Figure 3:
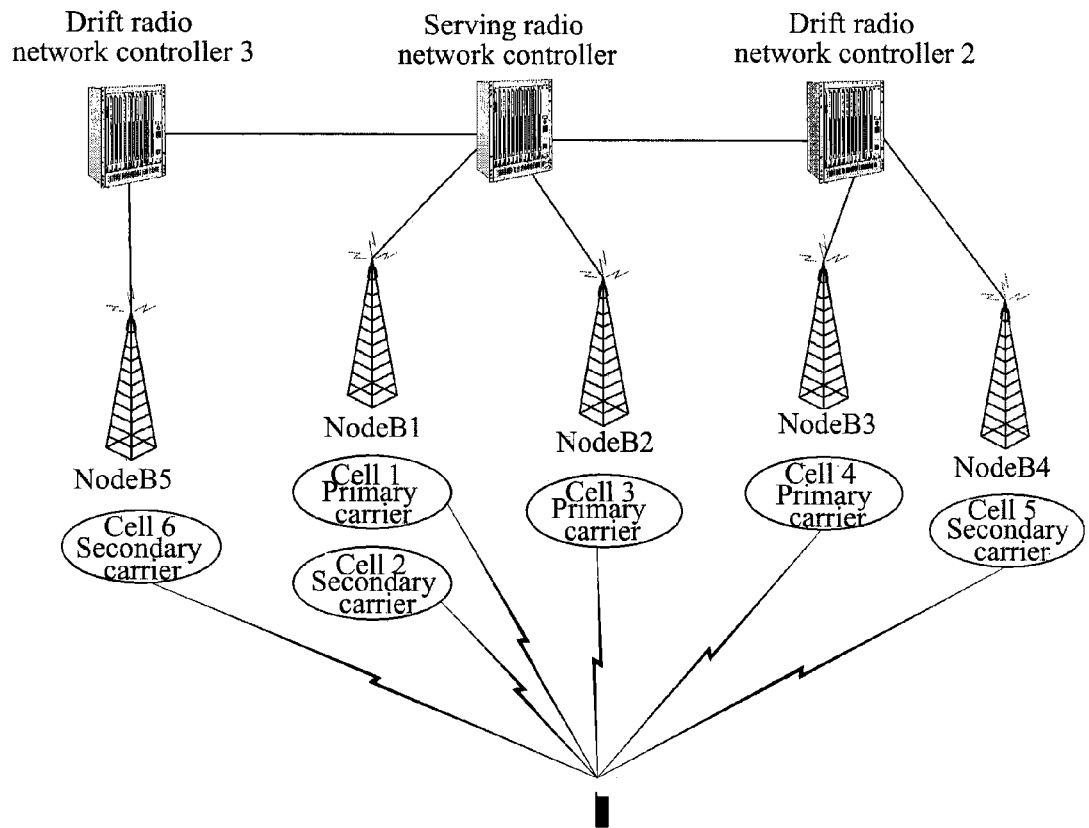
FIG. 3 is a schematic diagram of a complex scene where a multi-carrier high-speed uplink packet access technology is used.

The implementations of the technical scheme of the present invention will be further described in detail in combination with accompanying drawings:

Each of the following embodiments occurring in the scene illustrated in FIG. 3 is for the terminal using the multi-carrier high-speed uplink packet access technology.

The First Embodiment

Figure 5:
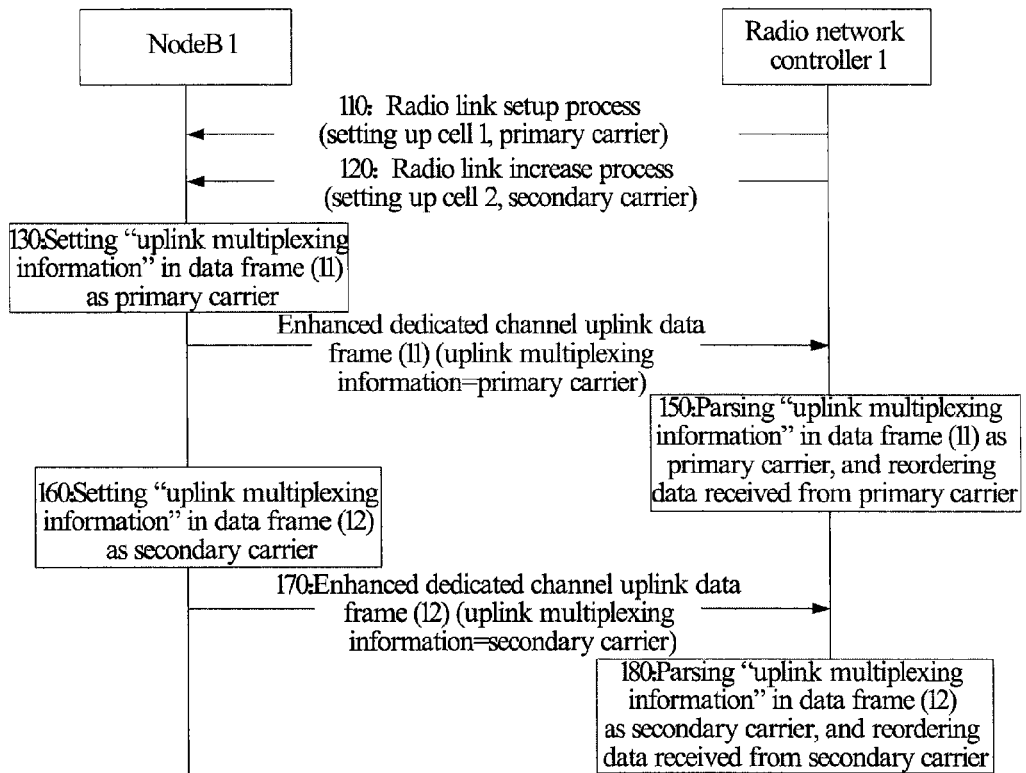
FIG. 5 is a schematic diagram of a processing procedure according to the first embodiment of the present invention.

The present embodiment describes a method for transmitting and receiving dual-carrier enhanced dedicated channel uplink data frames between NodeB 1 and radio network controller 1. NodeB 1 belongs to radio network controller 1. The processing procedure of the first embodiment is shown in FIG. 5, and each of its steps is described as follows.

In step 110, for a terminal using the dual-carrier high-speed uplink packet access technology, radio network controller 1 sets up a dual-carrier enhanced dedicated channel cell (that is, a cell using the enhanced dedicated channel in an uplink direction of one carrier in the two carriers), cell 1, through a radio link setup process in NodeB 1, and notifies NodeB 1 of a carrier identifier corresponding to the carrier of the dual-carrier enhanced dedicated channel cell in the multiple carriers. The carrier identifier corresponding to the carrier of cell 1 in the two carriers is the primary carrier.

In step 120, for the terminal using the dual-carrier high-speed uplink packet access technology, radio network controller 1 sets up a dual-carrier enhanced dedicated channel cell (that is, a cell using the enhanced dedicated channel in the uplink direction of one carrier in the two carriers), cell 2, through a radio link adding process in NodeB 1, and notifies NodeB 1 of a carrier identifier corresponding to the carrier of the dual-carrier enhanced dedicated channel cell in the multiple carriers. The carrier identifier corresponding to the carrier of cell 2 in the two carriers is the secondary carrier.

In step 130, NodeB 1 sets an enhanced dedicated channel uplink data frame using the carrier identifier information corresponding to the carrier of cell 1 in the multiple carriers. In cell 1 or in all multi-carrier enhanced dedicated channel cells with the same carrier frequency as cell 1, NodeB 1 sets "uplink multiplexing information" in the enhanced dedicated channel uplink data frame (numbered 11) as the carrier identifier (the primary carrier) corresponding to the carrier of cell 1 in the multiple carriers when putting data received from the air interface into the enhanced dedicated channel uplink data frame, that is, de-multiplexing a MAC-i protocol data unit received from the air interface into a MAC-is protocol data unit to put into the enhanced dedicated channel uplink data frame.

In step 140, NodeB 1 transmits the enhanced dedicated channel uplink data frame (numbered 11) to radio network controller 1, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the primary carrier) corresponding to the carrier of cell 1 in the multiple carriers.

In step 150, radio network controller 1 receives the enhanced dedicated channel uplink data frame (numbered 11), and parses the "uplink multiplexing information" in the enhanced dedicated channel uplink data frame to obtain information that the carrier identifier information corresponding to the carrier of the multi-carrier enhanced dedicated channel cell from which the data carried in the enhanced dedicated channel uplink data frame (numbered 11) is received in the multiple carriers is the primary carrier. Radio network controller 1 reorders the data carried in the enhanced dedicated channel uplink data frame received from the primary carrier.

In step 160, NodeB 1 sets the enhanced dedicated channel uplink data frame using the carrier identifier information corresponding to the carrier of cell 2 in the multiple carriers. In cell 2 or in all multi-carrier enhanced dedicated channel cells with the same carrier frequency as cell 2, NodeB 1 sets "uplink multiplexing information" in an enhanced dedicated channel uplink data frame (numbered 12) as the carrier identifier (the secondary carrier) corresponding to the carrier of cell 2 in the multiple carriers when putting data received from the air interface into the enhanced dedicated channel uplink data frame, i.e., de-multiplexing a MAC-i protocol data unit received from the air interface into a MAC-is protocol data unit to put into the enhanced dedicated channel uplink data frame.

In step 170, NodeB 1 transmits the enhanced dedicated channel uplink data frame (numbered 12) to radio network controller 1, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the secondary carrier) corresponding to the carrier of cell 2 in the multi-carrier.

In step 180, radio network controller 1 receives the enhanced dedicated channel uplink data frame (numbered 12), and parses the "uplink multiplexing information" in the enhanced dedicated channel uplink data frame to obtain information that the carrier identifier information corresponding to the carrier of the multi-carrier enhanced dedicated channel cell from which the data carried in the enhanced dedicated channel uplink data frame (numbered 12) is received in the multiple carriers is the secondary carrier. Radio network controller 1 reorders the data carried in the enhanced dedicated channel uplink data frame received from the secondary carrier.

The Second Embodiment

Figure 6:
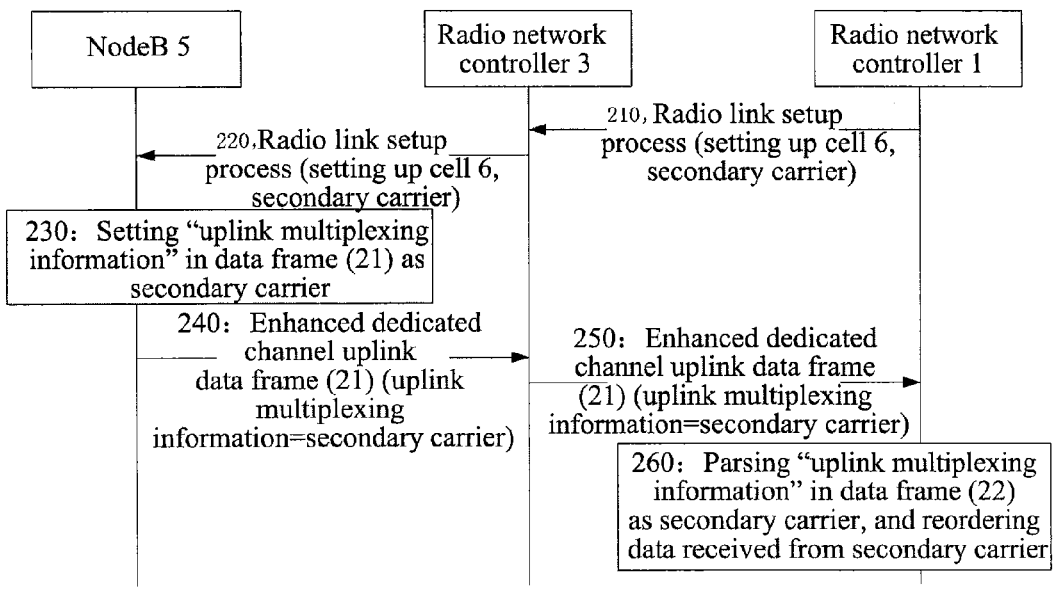
FIG. 6 is a schematic diagram of a processing procedure according to the second embodiment of the present invention.

The present embodiment describes a method for transmitting and receiving dual-carrier enhanced dedicated channel uplink data frames between NodeB 5 and radio network controller 1 (serving radio network controller) via radio network controller 3 (drift radio network controller). NodeB 5 belongs to radio network controller 3 (drift radio network controller). The processing procedure of the second embodiment is shown in FIG. 6, and each of its steps is described as follows.

In step 210, for a terminal using the dual-carrier high-speed uplink packet access technology, radio network controller 1 sets up a dual-carrier enhanced dedicated channel cell (that is, a cell using the enhanced dedicated channel in an uplink direction of one carrier in the two carriers), cell 6, through a radio link setup process in radio network controller 3, and notifies radio network controller 3 of a carrier identifier corresponding to the carrier of the dual-carrier enhanced dedicated channel cell in the multiple carriers. The carrier identifier corresponding to the carrier of cell 6 in the two carriers is the secondary carrier.

In step 220, radio network controller 3 sets up a dual-carrier enhanced dedicated channel cell (that is, a cell using the enhanced dedicated channel in the uplink direction of one carrier in the two carriers), cell 6, through a radio link adding process in NodeB 5, and notifies NodeB 5 of a carrier identifier corresponding to the carrier of the dual-carrier enhanced dedicated channel cell in the multiple carriers. The carrier identifier corresponding to the carrier of cell 6 in the two carriers is the secondary carrier.

In step 230, NodeB 5 sets an enhanced dedicated channel uplink data frame using the carrier identifier information corresponding to the carrier of cell 6 in the multiple carriers. In cell 6 or in all multi-carrier enhanced dedicated channel cells with the same carrier frequency as cell 6, NodeB 5 sets "uplink multiplexing information" in the enhanced dedicated channel uplink data frame (numbered 21) as the carrier identifier (the secondary carrier) corresponding to the carrier of cell 6 in the multiple carriers when putting data received from the air interface into the enhanced dedicated channel uplink data frame, that is, de-multiplexing a MAC-i protocol data unit received from the air interface into a MAC-is protocol data unit to put into the enhanced dedicated channel uplink data frame.

In step 240, NodeB 5 transmits the enhanced dedicated channel uplink data frame (numbered 21) to radio network controller 3, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the secondary carrier) corresponding to the carrier of cell 6 in the multiple carriers.

In step 250, radio network controller 3 forwards the enhanced dedicated channel uplink data frame (numbered 21) to radio network controller 1, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the secondary carrier) corresponding to the carrier of cell 6 in the multiple carriers.

In step 260, radio network controller 1 receives the enhanced dedicated channel uplink data frame (numbered 21), and parses the "uplink multiplexing information" in the enhanced dedicated channel uplink data frame to obtain information that the carrier identifier information corresponding to the carrier of the multi-carrier enhanced dedicated channel cell from which the data carried in the enhanced dedicated channel uplink data frame (numbered 21) is received in the multiple carriers is the secondary carrier. Radio network controller 1 reorders the data carried in the enhanced dedicated channel uplink data frame received from the secondary carrier.

The Third Embodiment

Figure 7:
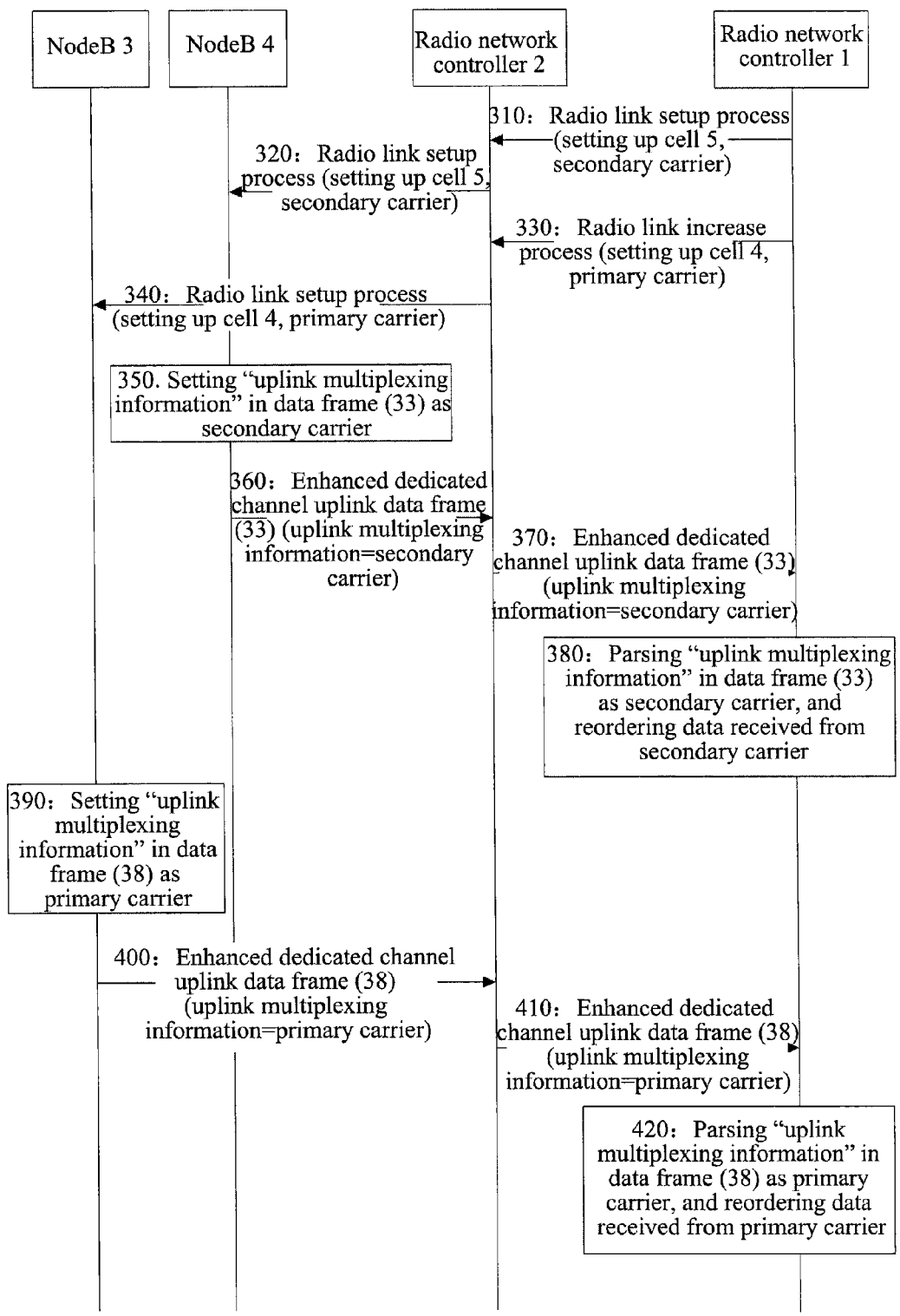
FIG. 7 is a schematic diagram of a processing procedure according to the third embodiment of the present invention.

The present embodiment describes a method for transmitting and receiving a dual-carrier enhanced dedicated channel uplink data frame between NodeB 3 and NodeB 4 and radio network controller 1 (serving radio network controller) via radio network controller 2 (drift radio network controller). NodeB 3 and NodeB 4 belong to radio network controller 2 (drift radio network controller). The processing procedure of the third embodiment is shown in FIG. 7, and each of its steps is described as follows.

In step 310, for a terminal using the dual-carrier high-speed uplink packet access technology, radio network controller 1 sets up a dual-carrier enhanced dedicated channel cell (that is, a cell using the enhanced dedicated channel in an uplink direction of one carrier in the two carriers), cell 5, through a radio link setup process in radio network controller 2, and notifies radio network controller 2 of a carrier identifier corresponding to the carrier of the dual-carrier enhanced dedicated channel cell in the multiple carriers. The carrier identifier corresponding to the carrier of cell 5 in the two carriers is the secondary carrier.

In step 320, radio network controller 2 sets up a dual-carrier enhanced dedicated channel cell (that is, a cell using the enhanced dedicated channel in the uplink direction of one carrier in the two carriers), cell 5, through a radio link adding process in NodeB 4, and notifies NodeB 4 of a carrier identifier corresponding to the carrier of the dual-carrier enhanced dedicated channel cell in the multiple carriers. The carrier identifier corresponding to the carrier of cell 5 in the two carriers is the secondary carrier.

In step 330, radio network controller 1 sets up a dual-carrier enhanced dedicated channel cell (that is, a cell using the enhanced dedicated channel in the uplink direction of one carrier in the two carriers), cell 4, through a radio link adding process in radio network controller 2, and notifies radio network controller 2 of a carrier identifier corresponding to the carrier of the dual-carrier enhanced dedicated channel cell in the multiple carriers. The carrier identifier corresponding to the carrier of cell 4 in the two carriers is the primary carrier.

In step 340, radio network controller 2 sets up a dual-carrier enhanced dedicated channel cell (that is, a cell using the enhanced dedicated channel in the uplink direction of one carrier in the two carriers), cell 4, through a radio link adding process in NodeB 3, and notifies NodeB 3 of a carrier identifier corresponding to the carrier of the dual-carrier enhanced dedicated channel cell in the multiple carriers. The carrier identifier corresponding to the carrier of cell 4 in the two carriers is the primary carrier.

In step 350, NodeB 4 sets an enhanced dedicated channel uplink data frame using the carrier identifier information corresponding to the carrier of cell 5 in the multiple carriers. In cell 5 or in all multi-carrier enhanced dedicated channel cells with the same carrier frequency as cell 5, NodeB 4 sets "uplink multiplexing information" in the enhanced dedicated channel uplink data frame (numbered 33) as the carrier identifier (the secondary carrier) corresponding to the carrier of cell 5 in the multiple carriers when putting data received from the air interface into the enhanced dedicated channel uplink data frame, that is, de-multiplexing a MAC-i protocol data unit received from the air interface into a MAC-is protocol data unit to put into the enhanced dedicated channel uplink data frame.

In step 360, NodeB 4 transmits the enhanced dedicated channel uplink data frame (numbered 33) to radio network controller 2, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the secondary carrier) corresponding to the carrier of cell 5 in the multiple carriers.

In step 370, radio network controller 2 forwards the enhanced dedicated channel uplink data frame (numbered 33) to radio network controller 2, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the secondary carrier) corresponding to the carrier of cell 5 in the multiple carriers.

In step 380, radio network controller 1 receives the enhanced dedicated channel uplink data frame (numbered 33), and parses the "uplink multiplexing information" in the enhanced dedicated channel uplink data frame to obtain information that the carrier identifier information corresponding to the carrier of the multi-carrier enhanced dedicated channel cell from which the data carried in the enhanced dedicated channel uplink data frame (numbered 33) is received in the multiple carriers is the secondary carrier. Radio network controller 1 reorders the data carried in the enhanced dedicated channel uplink data frame received from the secondary carrier.

In step 390, NodeB 3 sets an enhanced dedicated channel uplink data frame using the carrier identifier information corresponding to the carrier of cell 4 in the multiple carriers. In cell 4 or in all multi-carrier enhanced dedicated channel cells with the same carrier frequency as cell 4, NodeB 3 sets "uplink multiplexing information" in the enhanced dedicated channel uplink data frame (numbered 38) as the carrier identifier (the primary carrier) corresponding to the carrier of cell 4 in the multiple carriers when putting data received from the air interface into the enhanced dedicated channel uplink data frame, that is, de-multiplexing a MAC-i protocol data unit received from the air interface into a MAC-is protocol data unit to put into the enhanced dedicated channel uplink data frame.

In step 400, NodeB 3 transmits the enhanced dedicated channel uplink data frame (numbered 38) to radio network controller 2, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the primary carrier) corresponding to the carrier of cell 4 in the multiple carriers.

In step 410, radio network controller 2 forwards the enhanced dedicated channel uplink data frame (numbered 38) to radio network controller 1, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the primary carrier) corresponding to the carrier of cell 4 in the multiple carriers.

In step 420, radio network controller 1 receives the enhanced dedicated channel uplink data frame (numbered 38), and parses the "uplink multiplexing information" in the enhanced dedicated channel uplink data frame to obtain information that the carrier identifier information corresponding to the carrier of the multi-carrier enhanced dedicated channel cell from which the data carried in the enhanced dedicated channel uplink data frame (numbered 38) is received in the multiple carriers is the primary carrier. Radio network controller 1 reorders the data carried in the enhanced dedicated channel uplink data frame received from the primary carrier.

Each dual-carrier embodiment described above can be extended to multi-carrier, such as three-carrier, four-carrier, which is illustrated in the fourth embodiment hereinafter.

The Fourth Embodiment

Figure 8:
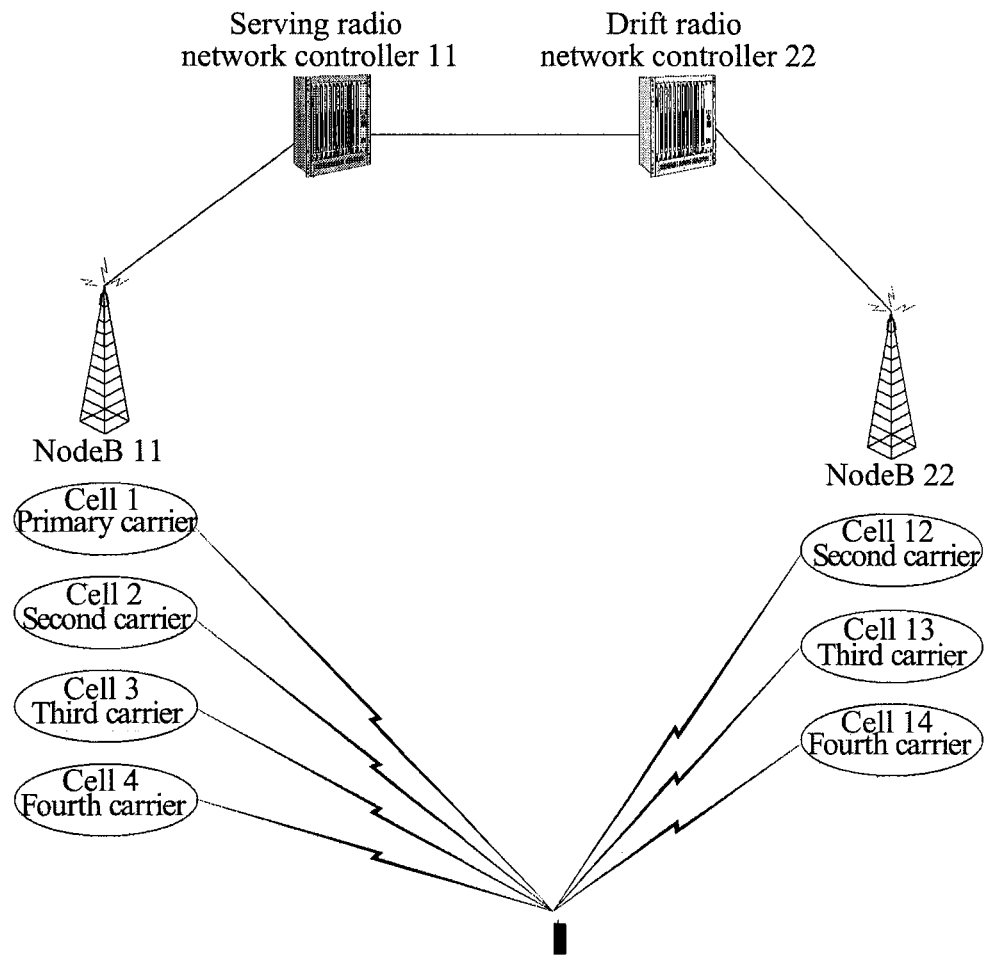
FIG. 8 is a schematic diagram of a complex scene where a multi-carrier high-speed uplink packet access technology is used according to the fourth embodiment of the present invention.

The present embodiment takes place in a scene illustrated in FIG. 8, where for a terminal using the multi-carrier high-speed uplink packet access technology, NodeB 11 dominated by radio network controller 11 (serving radio network controller) has four carriers, and under NodeB 11, cell 1 has the primary carrier (or the first carrier), cell 2 has the second carrier, cell 3 has the third carrier, and cell 4 has the fourth carrier; the NodeB 22 dominated by drift radio network controller 22 has three carriers, and under the NodeB 22, cell 12 has the second carrier, cell 13 has the third carrier, and cell 14 has the fourth carrier.

Figure 9:
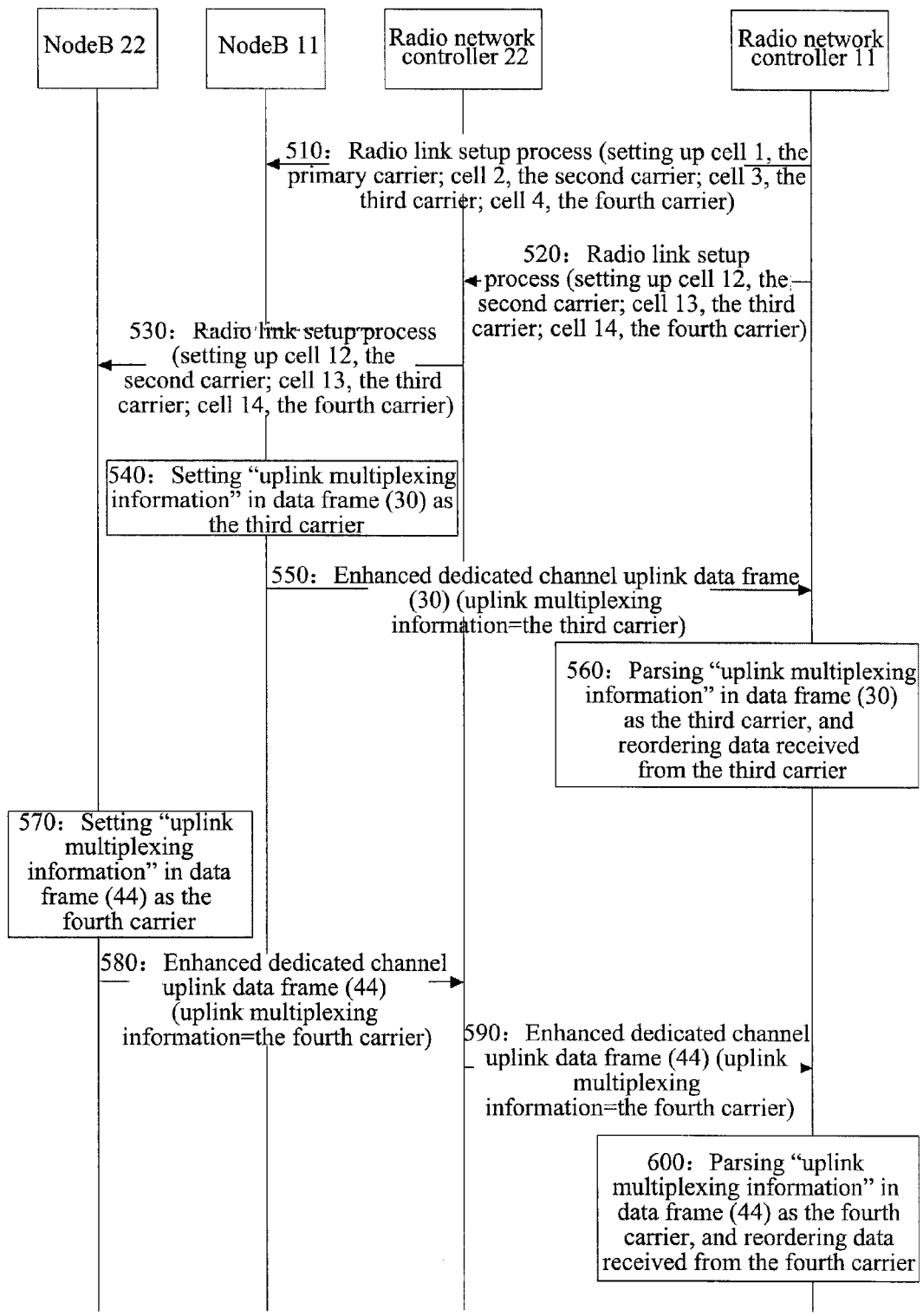
FIG. 9 is a diagram of a processing procedure according to the fourth embodiment of the present invention.

The processing procedure of the fourth embodiment is shown in FIG. 9, and each of its steps is described as follows.

In step 510, for a terminal using the dual-carrier high-speed uplink packet access technology, radio network controller 11 sets up four-carrier enhanced dedicated channel cells (that is, cells using the enhanced dedicated channel in an uplink direction of one carrier in the four carriers), cell 1, cell 2, cell 3 and cell 4, through a radio link setup process in NodeB 11, and notifies NodeB 11 of carrier identifiers corresponding to the carriers of the four-carrier enhanced dedicated channel cells in the four carriers. The carrier identifier corresponding to the carrier of cell 1 in the four carriers is the primary carrier; the carrier identifier corresponding to the carrier of cell 2 in the four carriers is the second carrier; the carrier identifier corresponding to the carrier of cell 3 in the four carriers is the third carrier; and the carrier identifier corresponding to the carrier of cell 4 in the four carriers is the fourth carrier.

In step 520, radio network controller 11 sets up four-carrier enhanced dedicated channel cells (that is, cells using the enhanced dedicated channel in the uplink direction of one carrier in the four carriers), cell 12, cell 13, and cell 14, through a radio link adding process in radio network controller 22, and notifies radio network controller 11 of carrier identifiers corresponding to the carriers of the four-carrier enhanced dedicated channel cells in the four carriers. The carrier identifier corresponding to the carrier of cell 12 in the four carriers is the second carrier, the carrier identifier corresponding to the carrier of cell 13 in the four carriers is the third carrier, and the carrier identifier corresponding to the carrier of cell 14 in the four carriers is the fourth carrier.

In step 530, radio network controller 22 sets up four-carrier enhanced dedicated channel cells (that is, cells using the enhanced dedicated channel in the uplink direction of one carrier in the four carriers), cell 12, cell 13, and cell 14, through a radio link adding process in NodeB 22, and notifies NodeB 22 of carrier identifiers corresponding to the carriers of the four-carrier enhanced dedicated channel cells in the four carriers. The carrier identifier corresponding to the carrier of cell 12 in the four carriers is the second carrier, the carrier identifier corresponding to the carrier of cell 13 in the four carriers is the third carrier, and the carrier identifier corresponding to the carrier of cell 14 in the four carriers is the fourth carrier.

In step 540, taking the third carrier as an example, NodeB 11 sets an enhanced dedicated channel uplink data frame using the carrier identifier information corresponding to the carrier of cell 3 in the multiple carriers. In cell 3 or in all multi-carrier enhanced dedicated channel cells with the same carrier frequency as cell 3, NodeB 11 sets "uplink multiplexing information" in the enhanced dedicated channel uplink data frame (numbered 30) as the carrier identifier (the third carrier) corresponding to the carrier of cell 3 in the multiple carriers when putting data received from the air interface into the enhanced dedicated channel uplink data frame, that is, de-multiplexing a MAC-i protocol data unit received from the air interface into a MAC-is protocol data unit to put into the enhanced dedicated channel uplink data frame.

In step 550, NodeB 11 transmits the enhanced dedicated channel uplink data frame (numbered 30) to radio network controller 11, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the third carrier) corresponding to the carrier of cell 3 in the multiple carriers.

In step 560, radio network controller 11 receives the enhanced dedicated channel uplink data frame (numbered 30), and parses the "uplink multiplexing information" in the enhanced dedicated channel uplink data frame to obtain information that the carrier identifier information corresponding to the carrier of the multi-carrier enhanced dedicated channel cell from which the data carried in the enhanced dedicated channel uplink data frame (numbered 30) is received in the multiple carriers is the third carrier. Radio network controller 11 reorders the data carried in the enhanced dedicated channel uplink data frame received from the third carrier.

In step 570, taking the fourth carrier as an example, NodeB 22 sets an enhanced dedicated channel uplink data frame using the carrier identifier information corresponding to the carrier of cell 14 in the multiple carriers. In cell 14 or in all multi-carrier enhanced dedicated channel cells with the same carrier frequency as cell 14, NodeB 22 sets "uplink multiplexing information" in the enhanced dedicated channel uplink data frame (numbered 44) as the carrier identifier (the fourth carrier) corresponding to the carrier of cell 14 in the multiple carriers when putting data received from the air interface into the enhanced dedicated channel uplink data frame, that is, de-multiplexing a MAC-i protocol data unit received from the air interface into a MAC-is protocol data unit to put into the enhanced dedicated channel uplink data frame.

In step 580, NodeB 22 transmits the enhanced dedicated channel uplink data frame (numbered 44) to radio network controller 22, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the fourth carrier) corresponding to the carrier of cell 14 in the multiple carriers.

In step 590, radio network controller 22 forwards the enhanced dedicated channel uplink data frame (numbered 44) to radio network controller 11, wherein the "uplink multiplexing information" in the enhanced dedicated channel uplink data frame is the carrier identifier corresponding to the carrier of the multi-carrier enhanced dedicated channel cell from which the data carried in the enhanced dedicated channel uplink data frame is received in the multiple carriers, i.e., the carrier identifier (the fourth carrier) corresponding to the carrier of cell 14 in the multiple carriers.

In step 600, radio network controller 11 receives the enhanced dedicated channel uplink data frame (numbered 44), and parses the "uplink multiplexing information" in the enhanced dedicated channel uplink data frame to obtain information that the carrier identifier information corresponding to the carrier of the multi-carrier enhanced dedicated channel cell from which the data carried in the enhanced dedicated channel uplink data frame (numbered 44) is received in the multiple carriers is the fourth carrier. Radio network controller 11 reorders the data carried in the enhanced dedicated channel uplink data frame received from the fourth carrier.

A system for transmitting multi-carrier uplink data at a network side which implements the method described above comprises a radio network controller and a NodeB, wherein the radio network controller is configured to, whenever setting up or adding a multi-carrier enhanced dedicated channel cell, notify a NodeB dominating the multi-carrier enhanced dedicated channel cell of carrier identifier information of a carrier corresponding to the multi-carrier enhanced dedicated channel cell; and the NodeB is configured to, whenever receiving data transmitted by a terminal using a multi-carrier high-speed uplink packet access technique in the multi-carrier enhanced dedicated channel cell via the carrier, carry the carrier identifier information of the carrier bearing the data in enhanced dedicated channel uplink data frames when constructing the enhanced dedicated channel uplink data frames, and transmit the constructed enhanced dedicated channel uplink data frames to the radio network controller.

The radio network controller is further configured to parse the carrier identifier information from the enhanced dedicated channel uplink data frames after receiving the enhanced dedicated channel uplink data frames, and reorder the received data with the same carrier identifier of the terminal.

The radio network controller includes a serving radio network controller and a drift radio network controller, wherein the serving radio network controller is configured to notify the NodeB dominating a multi-carrier enhanced dedicated channel cell of carrier identifier information of a carrier corresponding to the multi-carrier enhanced dedicated channel cell when indicating the NodeB to set up or add the multi-carrier enhanced dedicated channel cell, or notify the drift radio network controller of the carrier information of the carrier corresponding to the multi-carrier enhanced dedicated channel cell when indicating the drift radio network controller to set up or add the multi-carrier enhanced dedicated channel cell; and the drift radio network controller is configured to notify the NodeB dominating the multi-carrier enhanced dedicated channel cell of carrier identifier information of a carrier corresponding to the multi-carrier enhanced dedicated channel cell according to an indication of the serving radio network controller; and forward the enhanced dedicated channel uplink data frames to the serving radio network controller after receiving the enhanced dedicated channel uplink data frames transmitted by the NodeB.

Although for the purpose of illustrating examples, preferred embodiments of the present invention have been disclosed, it will be recognized by those skilled in the art that various improvements, additions and substitutions are also possible. Therefore, the scope of the present invention should not be limited to the embodiments described above.

It can be understood by those skilled in the art that all or some of the steps in the described method can be implemented by related hardware instructed by programs which may be stored in computer readable storage mediums, such as read-only memory, disk or CD-ROM, etc. Alternatively, all or some of the steps in the embodiments described above may also be implemented using one or more integrated circuits. Accordingly, each module/unit in the embodiments described above may be implemented in a form of hardware, or software functional module. The present invention is not limited to combinations of hardware and software in any particular form.

INDUSTRIAL APPLICABILITY

With the method in accordance with the present invention, the problem of confusing the received data from different carriers can be avoided such that the radio network controller of an aggregation party can clearly distinguish the data from various carriers to ensure normal transmission of actual service data of the terminal, avoid offline, and ensure the availability of the dual-carrier high-speed uplink packet access technology.

What we claim is:

1. A method for transmitting multi-carrier uplink data at a network side comprising:

whenever setting up or adding a multi-carrier enhanced dedicated channel cell, a radio network controller notifying a NodeB carrying out communication of the multi-carrier enhanced dedicated channel cell of carrier identifier information, wherein the carrier identifier information is used for identifying a carrier of the multi-carrier enhanced dedicated channel cell; and whenever the NodeB receiving data transmitted via the carrier of the multi-carrier enhanced dedicated channel cell by a terminal using a multi-carrier high-speed uplink packet access technique, the NodeB carrying the carrier identifier information of the carrier bearing the data into enhanced dedicated channel uplink data frames when constructing the enhanced dedicated channel uplink data frames, and transmitting the constructed enhanced dedicated channel uplink data frames to the radio network controller.

2. The method according to claim 1, further comprising:

the radio network controller parsing the carrier identifier information from the enhanced dedicated channel uplink data frames after receiving the enhanced dedicated channel uplink data frames, and reordering the received data carried by the enhanced dedicated channel uplink data frames with the same carrier identifier information.

3. The method according to claim 2, when the NodeB belongs to a serving radio network controller, the method comprising:

the serving radio network controller notifying the NodeB of carrier identifier information of a carrier of a multi-carrier enhanced dedicated channel cell when indicating the NodeB to set up or add the multi-carrier enhanced dedicated channel cell;

in the multi-carrier enhanced dedicated channel cell, after receiving the data transmitted by the terminal using the multi-carrier high-speed uplink packet access technology from an air interface, the NodeB carrying the carrier identifier information of the carrier of the multi-carrier enhanced dedicated channel cell in the enhanced dedicated channel uplink data frames when putting the data received from the air interface into the enhanced dedicated channel uplink data frames, and transmitting the enhanced dedicated channel uplink data frames to the serving radio network controller; and the serving radio network controller receiving and parsing the enhanced dedicated channel uplink data frames to obtain the carrier identifier information, and reordering the received data carried by the enhanced dedicated channel uplink data frames with the same carrier identifier information.

4. The method according to claim 2, when the NodeB belongs to a drift radio network controller, the method comprising:

a serving radio network controller indicating the drift radio network controller to set up or add a multi-carrier enhanced dedicated channel cell, and notifying the drift radio network controller of carrier identifier information corresponding to a carrier of the multi-carrier enhanced dedicated channel cell in multiple carriers;

the drift radio network controller indicating the NodeB dominated by the drift radio network controller to set up or add the multi-carrier enhanced dedicated channel cell according to an indication of the serving radio network controller, and notifying the NodeB of carrier identifier information of a carrier corresponding to the multi-carrier enhanced dedicated channel cell;

in the multi-carrier enhanced dedicated channel cell, after receiving the data transmitted by the terminal using the multi-carrier high-speed uplink packet access technology from an air interface, the NodeB carrying the carrier information of the carrier of the multi-carrier enhanced dedicated channel cell in the enhanced dedicated channel uplink data frames when putting the data received from the air interface into the enhanced dedicated channel uplink data frames, and transmitting the enhanced dedicated channel uplink data frames to the drift radio network controller;

the drift radio network controller forwarding the enhanced dedicated channel uplink data frames to the serving radio network controller; and the serving radio network controller receiving and parsing the enhanced dedicated channel uplink data frames to obtain the carrier identifier information, and reordering the received data carried by the enhanced dedicated channel uplink data frames with the same carrier identifier information.

5. The method according to claim 1, wherein
the radio network controller sets up or adds the multi-carrier enhanced dedicated channel cell through a radio link setup process or a radio link adding process.

6. The method according to claim 1, wherein
in a dual-carrier system, the carrier identifier information identifies a primary carrier and a secondary carrier; in a three-carrier system, the carrier identifier information identifies a primary carrier, a second carrier and a third carrier; and in a four-carrier system, the carrier identifier information identifies a primary carrier, a second carrier, a third carrier and a fourth carrier.

7. The method according to claim 1, wherein carrying the carrier identifier information in the enhanced dedicated channel uplink data frames comprises filling uplink multiplexing information information-elements in the enhanced dedicated channel uplink data frames with the carrier identifier information of the carrier.

8. A system for transmitting multi-carrier uplink data at a network side comprising a radio network controller and a NodeB; wherein the radio network controller is configured to, whenever setting up or adding a multi-carrier enhanced dedicated channel cell, notify a NodeB carrying out communication of the multi-carrier enhanced dedicated channel cell of carrier identifier information, wherein the carrier identifier information is used for identifying a carrier of the multi-carrier enhanced dedicated channel cell; and the NodeB is configured to, whenever receiving data transmitted via the carrier of the multi-carrier enhanced dedicated channel cell by a terminal using a multi-carrier high-speed uplink packet access technique, carry the carrier identifier information of the carrier bearing the data into enhanced dedicated channel uplink data frames when constructing the enhanced dedicated channel uplink data frames, and transmit the constructed enhanced dedicated channel uplink data frames to the radio network controller.

9. The system according to claim 8, wherein
the radio network controller is further configured to parse the carrier identifier information from the enhanced dedicated channel uplink data frames after receiving the enhanced dedicated channel uplink data frames, and reorder the received data carried by the enhanced dedicated channel uplink data frames with the same carrier identifier information.

10. The system according to claim 8, wherein the radio network controller includes a serving radio network controller and a drift radio network controller, and wherein the serving radio network controller is configured to notify the NodeB dominating a multi-carrier enhanced dedicated channel cell of carrier identifier information of a carrier of the multi-carrier enhanced dedicated channel cell when indicating the NodeB to set up or add the multi-carrier enhanced dedicated channel cell, or notify the drift radio network controller of the carrier information of the carrier corresponding to the multi-carrier enhanced dedicated channel cell when indicating the drift radio network controller to set up or add the multi-carrier enhanced dedicated channel cell; and the drift radio network controller is configured to notify the NodeB dominating the multi-carrier enhanced dedicated channel cell of carrier identifier information of a carrier corresponding to the multi-carrier enhanced dedicated channel cell according to an indication of the serving radio network controller; and forward the enhanced dedicated channel uplink data frames to the serving radio network controller after receiving the enhanced dedicated channel uplink data frames transmitted by the NodeB.

11. The method according to claim 2, wherein
the radio network controller sets up or adds the multi-carrier enhanced dedicated channel cell through a radio link setup process or a radio link adding process.

12. The method according to claim 3, wherein
the radio network controller sets up or adds the multi-carrier enhanced dedicated channel cell through a radio link setup process or a radio link adding process.

13. The method according to claim 4, wherein
the radio network controller sets up or adds the multi-carrier enhanced dedicated channel cell through a radio link setup process or a radio link adding process.

14. The method according to claim 2, wherein
in a dual-carrier system, the carrier identifier information identifies a primary carrier and a secondary carrier; in a three-carrier system, the carrier identifier information identifies a primary carrier, a second carrier and a third carrier; and in a four-carrier system, the carrier identifier information identifies a primary carrier, a second carrier, a third carrier and a fourth carrier.

15. The method according to claim 3, wherein in a dual-carrier system, the carrier identifier information identifies a primary carrier and a secondary carrier; in a three-carrier system, the carrier identifier information identifies a primary carrier, a second carrier and a third carrier; and in a four-carrier system, the carrier identifier information identifies a primary carrier, a second carrier, a third carrier and a fourth carrier.

16. The method according to claim 4, wherein in a dual-carrier system, the carrier identifier information identifies a primary carrier and a secondary carrier; in a three-carrier system, the carrier identifier information identifies a primary carrier, a second carrier and a third carrier; and in a four-carrier system, the carrier identifier information identifies a primary carrier, a second carrier, a third carrier and a fourth carrier.

17. The method according to claim 2, wherein carrying the carrier identifier information in the enhanced dedicated channel uplink data frames comprises filling uplink multiplexing information information-elements in the enhanced dedicated channel uplink data frames with the carrier identifier information of the carrier.

18. The method according to claim 3, wherein carrying the carrier identifier information in the enhanced dedicated channel uplink data frames comprises filling uplink multiplexing information information-elements in the enhanced dedicated channel uplink data frames with the carrier identifier information of the carrier.

19. The method according to claim 4, wherein carrying the carrier identifier information in the enhanced dedicated channel uplink data frames comprises filling uplink multiplexing information information-elements in the enhanced dedicated channel uplink data frames with the carrier identifier information of the carrier.

* * * * *